(12) United States Patent
Wakim

(10) Patent No.: US 7,519,325 B2
(45) Date of Patent: Apr. 14, 2009

(54) DOCKING OF SHORT-RANGE WIRELESS COMMUNICATION TAGS WITH MOBILE TERMINALS

(75) Inventor: Peter Wakim, Boston, MA (US)

(73) Assignee: Nokia Corporation, Espoo (FI)

( * ) Notice: Subject to any disclaimer, the term of this patent is extended or adjusted under 35 U.S.C. 154(b) by 686 days.

(21) Appl. No.: 11/026,108

(22) Filed: Dec. 30, 2004

(65) Prior Publication Data
US 2006/0148404 A1 Jul. 6, 2006

(51) Int. Cl.
H04B 7/00 (2006.01)
(52) U.S. Cl. ............... 455/41.2; 455/41.1; 455/558; 455/566.1; 340/572.4; 340/539.11; 340/505
(58) Field of Classification Search ............ 455/41.1, 455/41.2, 406, 407, 408, 556.1, 558; 340/572.4, 340/539.11, 505, 10.1
See application file for complete search history.

(56) References Cited

U.S. PATENT DOCUMENTS

| 5,380,991 | A | * | 1/1995 | Valencia et al. ............ 235/383 |
| 5,724,417 | A | * | 3/1998 | Bartholomew et al. . 379/211.05 |
| 5,915,226 | A | | 6/1999 | Martineau |
| 5,986,570 | A | | 11/1999 | Black et al. |
| 6,097,292 | A | | 8/2000 | Kelly et al. |
| 6,122,355 | A | | 9/2000 | Strohl |
| 6,205,327 | B1 | | 3/2001 | Sentinelli |
| 6,265,962 | B1 | | 7/2001 | Black et al. |
| 6,377,203 | B1 | | 4/2002 | Doany |
| 6,557,753 | B1 | | 5/2003 | Beaujard et al. |
| 7,058,397 | B2 | * | 6/2006 | Ritter ......................... 455/419 |
| 7,188,089 | B2 | * | 3/2007 | Goldthwaite et al. .......... 705/67 |
| 2001/0044321 | A1 | * | 11/2001 | Ausems et al. .............. 455/556 |
| 2002/0098830 | A1 | | 7/2002 | Lauper et al. |
| 2003/0102960 | A1 | * | 6/2003 | Beigel et al. ............... 340/10.1 |
| 2003/0220711 | A1 | * | 11/2003 | Allen .......................... 700/215 |
| 2005/0234778 | A1 | | 10/2005 | Sperduti et al. |
| 2005/0255840 | A1 | | 11/2005 | Markham |
| 2006/0119471 | A1 | * | 6/2006 | Rudolph et al. .......... 340/10.41 |

FOREIGN PATENT DOCUMENTS

EP 1 088 284 B1 4/2003
GB 2329799 A * 3/1999

* cited by examiner

Primary Examiner—Tuan A Pham
(74) Attorney, Agent, or Firm—Alston & Bird LLP

(57) ABSTRACT

The invention provides for docking short-range wireless communication tags, which may be Radio Frequency Identification (RFID) or near Field Communication (NFC) smart cards, onto a mobile terminal having a corresponding short-range wireless communication reader device, such as an RFID reader or a NFC reader. Docking of the tag to the mobile terminal may take the form of attaching or otherwise affixing the tag to the mobile terminal via a tag holding mechanism, such that the reader device may periodically read the tag and also provide for interrogation and reading of other external short-range wireless communication tags and devices in the proximity of the mobile terminal when the reader device is not communicating with the docked tag.

33 Claims, 5 Drawing Sheets

DOCKING OF SHORT-RANGE WIRELESS COMMUNICATION TAGS WITH MOBILE TERMINALS

FIELD OF THE INVENTION

The present invention relates to short-range wireless communication and, more specifically to methods, systems and devices for docking a short-range wireless communication tag, such as a Radio Frequency Identification (RFID) or Near Field Communication (NFC) smart card with a mobile terminal, such as a mobile telephone.

BACKGROUND OF THE INVENTION

Telecommunication services and, more particularly, mobile services, such as mobile telephone services are typically offered by service providers to consumers via subscription plans or via prepaid service plans. The prepaid service plan is typically very attractive to low income level consumers who may not otherwise be able to afford long-term subscription plans. Prepaid mobile service lets the mobile service user stay connected without any monthly contractual obligations therefore allowing more flexibility in terms of when the user uses the service.

When prepay or "pay as you go" mobile services were first introduced in Europe in 1995, Western European Cellular penetration was just below 6%. It has since climbed to above 74%. This is largely due to the enormous impact which "contract free", "commitment free" prepaid mobile services have made to this growth. In fact, about 64% of all cellular users in Western Europe are now connected to mobile services via prepay plans. In addition, prepay plans are especially convenient for foreign travelers who desire mobile services while visiting a country outside of their own subscription service plan.

If mobile service providers desire to attract more low-income customers they must provide prepaid service in a cost efficient manner. This need is especially prevalent in third-world countries in which mobile communication is a developing new market, such as India, China and the like. In these markets, prepaid subscriptions dominate due to the overwhelming majority of the populace being low income. Thus, the service provider is challenged with providing service knowing that although the volume will be high, the average revenue per unit (ARPU) will be characteristically low.

Currently prepaid services are generally offered in the form of scratch card solutions. The scratch card is a laminated card that includes a card number that is revealed to the customer upon "scratching-off" a latex material that overlays the card number. However, this type of prepaid service has a high fixed cost per top up (i.e., a new card is typically required to replenish an account) and does not provide for sharing of the mobile terminal device (i.e., each mobile terminal is associated with one individual user). In addition, this type of prepaid service is specifically associated with a single mobile terminal and, therefore, does not readily provide for account balances to be transportable amongst different mobile terminals Besides scratch cards, other forms of prepaid plans have been implemented to prepay for various goods and services. For example, secure, contact-less, smart cards or stored value cards have been used to purchase goods and services. Such cards are currently deployed in large volume in the commuter public transportation system environment, such as train, subways, and other forms of public rapid transit. In addition, such cards have been used by retail shopping entities as a form of gift certificates or gift cards. For example, he Philips Electronics of the Netherlands has introduced MIFARE® Interface Platform which provides electronic ticketing in public transport. Travelers just wave their card over a reader at the turnstiles or entry, benefiting from improved convenience and speed in the ticketing process. In another example, the Sony Corporation of Japan has developed the FeliCa system that implements contactless smart card technology. The smart card is difficult to forge/reconstruct, and allows data to be sent/received at high speed and with high security. The Sony system is also environment-friendly since the card can be used over-and-over virtually forever by rewriting the data. However, this type of prepaid smart card has not been readily adaptable to prepaid mobile communication service plans.

Recently prepaid smart cards for wireless telephone communication have been proposed. See for example U.S. Pat. No. 5,915,226, entitled, "Prepaid Smart Card in a GSM based Wireless Telephone Network and Method for Operating Prepaid Cards", issued Jan. 22, 1999, in the name of inventor Martineau, which teaches an installing a prepaid Subscriber Identity Module (SIM) card in a mobile terminal. The prepaid SIM card includes a predefined amount of service access corresponding to a specific amount of monetary funds. In addition, U.S. Pat. No. 6,205,327, entitled "Radio Mobile Terminal Provided With an Additional Reader of Chip Cards", issued on Mar. 20, 2001, in the name of inventor Sentinelli, teaches an internal smart card reader slot, in addition to the conventional SIM card slot. The mobile terminal uses the smart card for accessing mobile network services. However, in these systems the need to install the card in the mobile terminal means that interchanging the cards is inefficient and requires either a degree of technical competency on behalf of the terminal user or the need for the smart card selling entity to install the card in the terminal.

When considering means to improve systems for prepaying for mobile services, it must be realized that many mobile terminals, for example mobile telephones, personal digital assistants (PDAs) and the like, are now being brought to market with Near Field Communication (NFC) and/or Radio Frequency Identification (RFID) communication capacity. Such terminals are equipped with reader devices that allow the terminal to sense, capture and read NFC or RFID communication. By providing for such readers in mobile terminals it enhances their overall functionality and allows for read data to be automatically inputted into other applications executed on the device (i.e., capturing contact information and automatically transferring it to a telephone book application). Many mobile terminals are already equipped with digital cameras that provide the ability to capture images and, in some instances, are additionally equipped with applications that provide NFC functionality. With the use of mobile terminals becoming increasingly prominent in society, the machine-readable data reader functionality will allow all such device users to readily acquire and store all sorts of information from machine-readable data (i.e., codes, tags and the like).

Thus a need exists to develop systems, devices and corresponding methods that provide for an alternative means for providing prepay plans to mobile service communication users. The desired systems, devices and corresponding methods should leverage existing NFC and/or RFID reading capabilities in mobile terminals along with smart card technology. The desired systems, devices and method should provide for multiple users to share one mobile terminal by readily transferring a user's account balance from terminal to terminal. In this regard, the desired system will allow for multiple users, who may find it economically unfeasible to purchase or otherwise acquire a mobile terminal, to communicate by sharing mobile terminals. In addition, the desired systems, devices and methods should be able to provide for cost effective payment top up, even in instances in which the incremental increase in the debit account is miniscule. The desired systems, devices and methods should provide for ease and efficiency in user involvement and user account management.

BRIEF SUMMARY OF THE INVENTION

The present invention provides for methods, systems and devices for docking short-range wireless communication tags, such as Radio Frequency Identification (RFID) or near Field Communication (NFC) smart cards with a mobile terminal having a corresponding short-range wireless communication reader device, such as an RFID reader or a NFC reader. Docking of the tag to the mobile terminal may take the form of attaching or otherwise affixing the tag to the mobile terminal via a tag holding mechanism, such that the reader device may periodically read the tag and also provide for reading of other short-range wireless communication tags and devices in the proximity of the mobile terminal during those periods when the reader is not reading the tag information.

In one advantageous embodiment of the invention the short-range communication tag will include storage of prepaid network service credit and, as such, the mobile terminal with a docked tag can be provide network service access if the tag includes a sufficient amount of credit; either monetary fund credit or network service minutes credit. The tag will remain docked to the terminal during network service use, such that the value of the credit stored on the tag will be decremented continuously from the tag in real-time by the reader device based on use of the network service, e.g. cellular telephone network service, internet service, mobile television services or the like.

In addition to including storage of prepaid network service credit, the tag will also typically include service provider identification corresponding to the network service that has been prepaid and a user identification corresponding to the user that has prepaid for the network services. For example, the user identification may take the form of a user's telephone number and once the reader reads the information and stores such in terminal memory, the terminal is then able to receive or send telephone calls from and to the user's telephone number. The inclusion of such information on the tag allows the subscriber identity module (SIM) card within the mobile terminal to be a generic as to the subscriber; i.e., the user identification on the tag defines the user/subscriber as opposed to the SIM card, which is internal to the mobile terminal. Thus by interchanging different tags docked to the mobile terminal, in which each tag is possessed to a different user/subscriber, the mobile terminal can support and be used by multiple users/subscribers.

One embodiment of the invention is defined by a mobile terminal device that includes a processor, a short-range wireless communication reader in communication with the processor and a short-range wireless communication tag holding mechanism affixed to the mobile terminal. The reader is adapted to communicate with a tag placed in the holding mechanism while adapted to also communicate with external short-range wireless communication capable devices. Typically, the reader will be configured to periodically read the docked tag and to interrogate and read the external devices when the device is not reading the docked tag. As such, the present invention is able to provide a form of concurrent reading of the docked tag and the external short-range wireless communication devices.

The mobile terminal may be further defined as a mobile telephone device, a personal digital assistant (PDA) device or the like. The short-range wireless communication reader and the may include a Radio Frequency Identification (RFID) reader, a Near Field Communication (NFC) reader or the like. The tag holding mechanism will correspond to the reader device in the mobile terminal. For example if the reader device is an RFID reader, the tag holding mechanism will accommodate RFID tags, etc.

The tag holding mechanism will be any mechanism suitable for docking a tag onto the mobile terminal. For example, the holding mechanism may be a sleeve, slot or the like configured in the mobile terminal such that the optimal tag reading position is achieved when a tag is placed in the holding mechanism. Typically, the holding mechanism will be an external holding mechanism, however, in alternate embodiments the tag holding mechanism may internal to the mobile terminal. The tag holding mechanism may further define the tag as a Smart Card having accessible memory. In alternate embodiments, the mobile terminal may provide for multiple tag holding mechanisms, such that two tags may be docked simultaneously within the mobile terminal.

In yet another embodiment of the invention a mobile terminal device is defined having a processor, a short-range wireless communication reader in communication with the processor and a short-range wireless communication tag holding mechanism affixed to the mobile terminal. The reader is adapted to periodically read a tag placed in the holding mechanism to obtain network service credit information that enables a user of the tag to access network service via the mobile terminal device and adapted to read one or more external short-range wireless communication capable devices when the reader is not reading the tag. In this regard, the tag, for example a Smart Card, will provide for prepaid network service credit, such as a specified monetary amount or minutes for cellular network service, and the mobile terminal will read the tag and if sufficient credit exists, the terminal will access the cellular network, i.e., place or receive cellular network telephone calls.

The mobile terminal may be further defined as a mobile telephone device, a personal digital assistant (PDA) device or the like. The short-range wireless communication reader and the may include a Radio Frequency Identification (RFID) reader, a Near Field Communication (NFC) reader or the like. The tag holding mechanism will correspond to the reader device in the mobile terminal. For example if the reader device is an RFID reader, the tag holding mechanism will accommodate RFID tags, etc.

In specific embodiments, the mobile terminal may include a plurality of tag holding mechanisms. Multiple tag holding mechanisms allow for tags supporting different network services to be docked at the mobile terminal simultaneously. For example, if the mobile terminal supports both cellular telephone services and digital broadcast services, which may be provided by a different service provider, multiple tag holding mechanisms would allow for each service to have corresponding prepaid accounts.

The device will typically include memory in communication with the processor that stores prepaid network credit information read from a tag placed in the holding mechanism.

The invention is also defined by a short-range wireless communication tag device that includes a means for communication via short-range wireless communication and a dynamic memory unit that stores prepaid network service credit information, network service provider identification and tag user identification. A mobile terminal equipped with a short-range communication reader can communicate with the tag in order to provide prepaid network service to the mobile terminal while also providing the capability to communicate with external short-range wireless communication devices.

The tag will typically take the form of a smart card, such as a Radio Frequency Identification (RFID) smart card, a Near Field Communication (NFC) smart card or the like. The prepaid network service credit information will typically be a monetary amount or a specified number of service minutes and the network service may be cellular network service, Internet service or the like. A user of the tag will purchase the tag with a specified amount of network service credit and the re-usable nature of the tag will typically provide for additional credit to be added to the tag as the user depletes the credit on the tag. The tag will typically be configured to allow for any denomination (i.e., from cents to dollars) or time increment (i.e., from seconds to hours) to be added, also commonly referred to as topped, to the tag/card. The tag user identification may take the form of a user's telephone number or the like.

In addition to the credit information, the service provider information and the user ID information, the tag may store other information relevant to the mobile terminal. For example, the tag may store a user telephone book/directory, user bookmarks, user settings, a Personal Information Management (PIM) module or the like.

The tag/card will communicate with a mobile device such that when the tag/card is docked in the device, the device will recognize the network service provider, the user (i.e., the telephone number or the like) and credit the user with the amount, monetary or minutes, of credit that are stored on the tag/card. The generic nature of the corresponding mobile terminal, which is based on a generic or "dummy" Subscriber Information Module (SIM), allows for one user of the mobile terminal to be granted network access through docking of their respective tag/card into the terminal and for other users of the terminal to also, subsequently, be granted access to the network by docking their respective tag/card into the terminal.

In combination and according to an alternate embodiment of the invention a system is defined for providing prepaid network service communication to a mobile terminal. The system includes a short-range wireless communication tag that includes prepaid mobile communication service credit information; and a mobile terminal device. The mobile terminal device includes a processor, a short-range wireless communication reader in communication with the processor, and a short-range wireless communication tag holding mechanism affixed to the mobile terminal for holding the tag. The reader is adapted to communicate with external short-range wireless communication capable devices while also communicating with the tag placed in the holding mechanism such that reading the tag provides mobile terminal device access to the mobile communication network if sufficient prepaid credit information is included in the tag.

As in previous embodiment, the mobile terminal may be further defined as a mobile telephone device, a personal digital assistant (PDA) device or the like. The short-range wireless communication reader and the may include a Radio Frequency Identification (RFID) reader, a Near Field Communication (NFC) reader or the like. The tag holding mechanism will correspond to the reader device in the mobile terminal. For example if the reader device is an RFID reader, the tag holding mechanism will accommodate RFID tags, etc. The short-range wireless communication tag may further be defined as a RFID or NFC smart card tag.

The invention is further defined in a method for providing prepaid network services to a mobile terminal. The method includes the steps of (a) providing a short-range wireless communication tag that stores prepaid network credit information and network service provider identification, (b) docking the tag at a mobile terminal that is equipped with a short-range wireless communication reader, (c) reading, at the mobile terminal, the prepaid network credit information and the network service provider identification from the associated tag, and (d) providing access to the network if the prepaid network credit information is determined to be sufficient for paying for the network service. The network service may include, but is not limited to, cellular telephone service, Internet service, digital video broadcast service and the like.

The tag that is provided is typically a Radio Frequency Identification (RFID) smart card tag, a Near Field Communication (NFC) smart card tag or the like. Docking of the tag at a mobile terminal may provide for temporarily attaching or otherwise affixing the tag to a mobile terminal that is equipped with an external or internal short-range wireless communication tag holding mechanism.

Additionally, the method may provide for the step of decrementing the prepaid network credit information stored on the tag as a result of the mobile terminal being provided the network service. In addition, the method may provide for incrementing the prepaid credit information stored on the tag as a result of paying for additional network service credit. Paying for additional service credit may occur at a Point of Sale (POS) kiosk or other service provider designated location.

The invention is also embodied in a computer program product for providing a mobile terminal communication capabilities with a terminal-associated short-range wireless communication tag and one or more external short-range wireless communication devices. The computer program product includes a computer readable storage medium having computer-readable program instructions embodied in the medium. The computer-readable program instructions include first instructions for providing periodic short-range wireless communication reading of a short-range wireless communication tag that is docked at the mobile terminal and second instructions for providing short-range wireless communication reading of external short-range wireless communication devices absent execution of the first instructions.

The first instructions may provide for periodic short-range communication of pre-paid network service access credit to allow a user of the mobile terminal to access the network service. Additionally, the first instructions may provide for periodic short-range communication that define a frequency for periodic short-range communication based on the billing terms of a pre-paid network service associated with the short-range wireless communication tag.

The first instructions may additionally provide for reading a tag identification that distinguishes the tag from external short-range wireless communication devices. Distinguishing the tag from the external devices insures that only the tag is read during appropriate predefined tag reading periods.

Thus, the present invention provides systems, devices and corresponding methods that provide for docking a short-range wireless communication tag; i.e., an RFID smart card, an NFC smart card or the like to a mobile terminal having corresponding tag reading capabilities. More specifically, the invention provides an alternative means for providing prepay plans to mobile service communication users. The systems, devices and corresponding methods leverage existing NFC and/or RFID reading capabilities in mobile terminals along with smart card technology. The systems, devices and methods provide for multiple users to share one mobile terminal by readily transferring a user's account balance from terminal to terminal. In this regard, the system will allow for multiple users, who may find it economically unfeasible to purchase or otherwise acquire a mobile terminal, to communicate wirelessly by sharing mobile terminals. In addition, the invention is able to provide for cost effective payment top up, even in instances in which the incremental increase in the debit account is diminutive. The invention will additionally provide for ease and efficiency in user involvement and user account management.

BRIEF DESCRIPTION OF THE DRAWINGS

Figure 1:
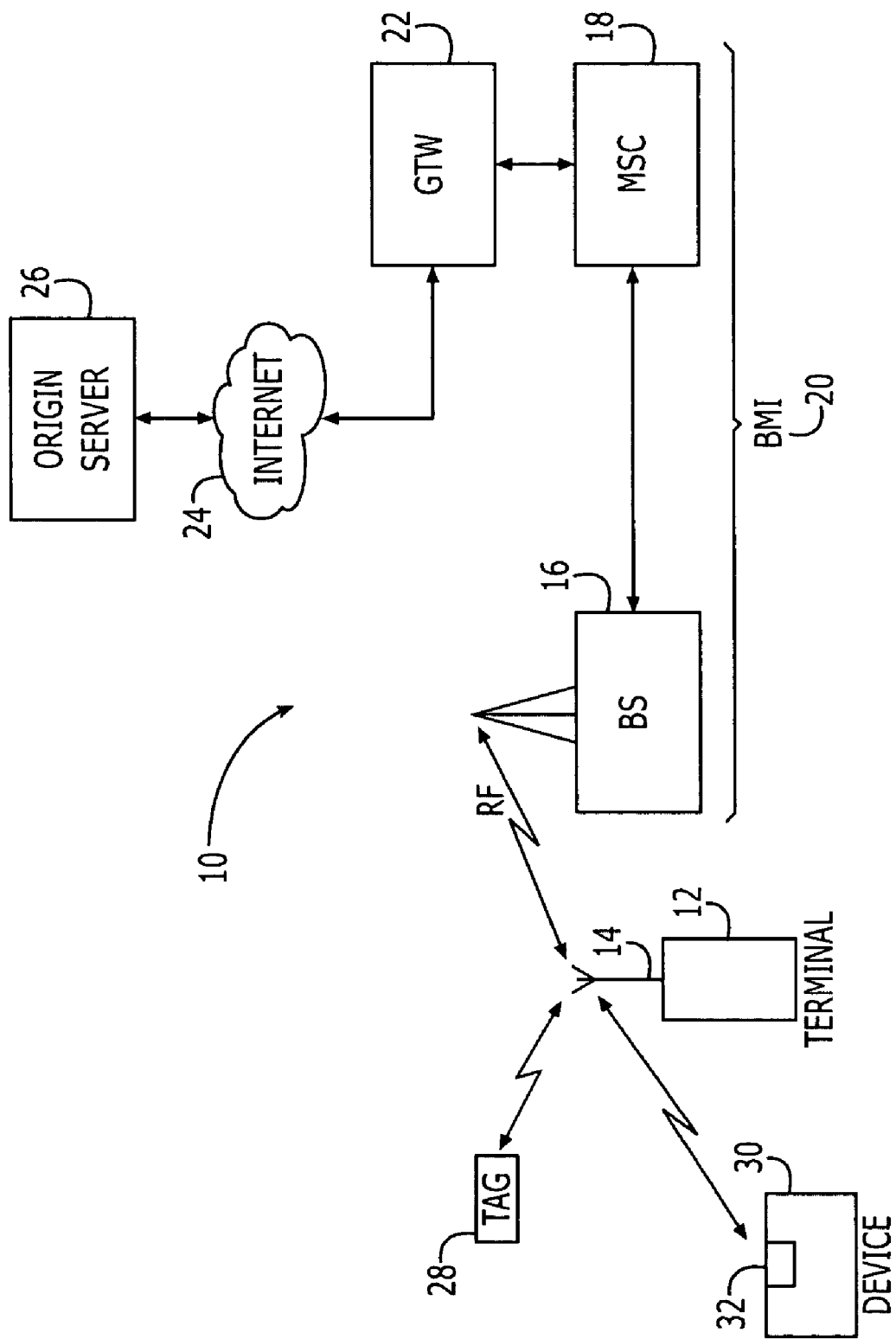

Having thus described the invention in general terms, reference will now be made to the accompanying drawings, which are not necessarily drawn to scale, and wherein:

FIG. 1 is a block diagram of a cellular network, including a mobile terminal having short-range wireless communication capabilities, in accordance with an embodiment of the present invention.

Figure 2:
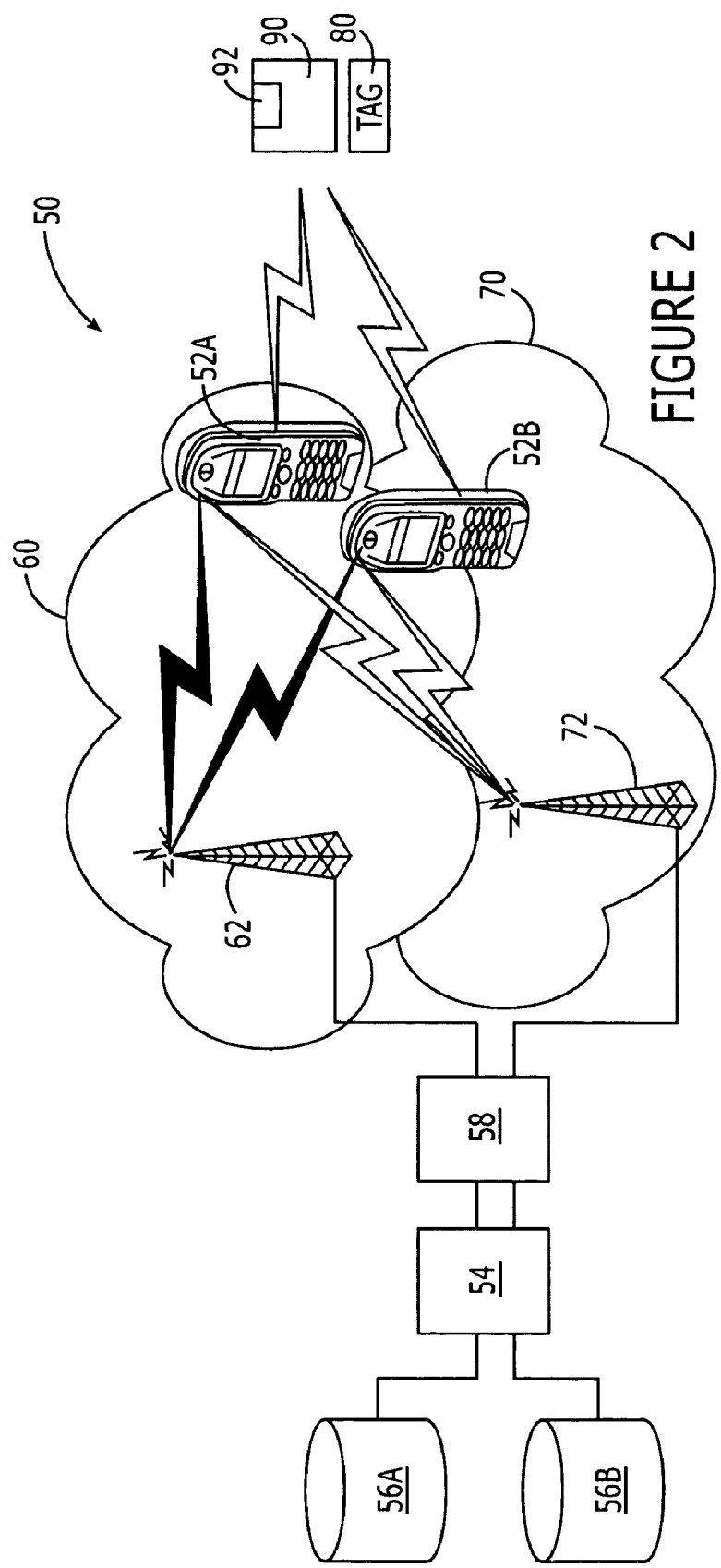

FIG. 2 is a block diagram of a digital broadcast network including a mobile terminal having short-range wireless communication capabilities, in accordance with an embodiment of the present invention.

Figure 3:
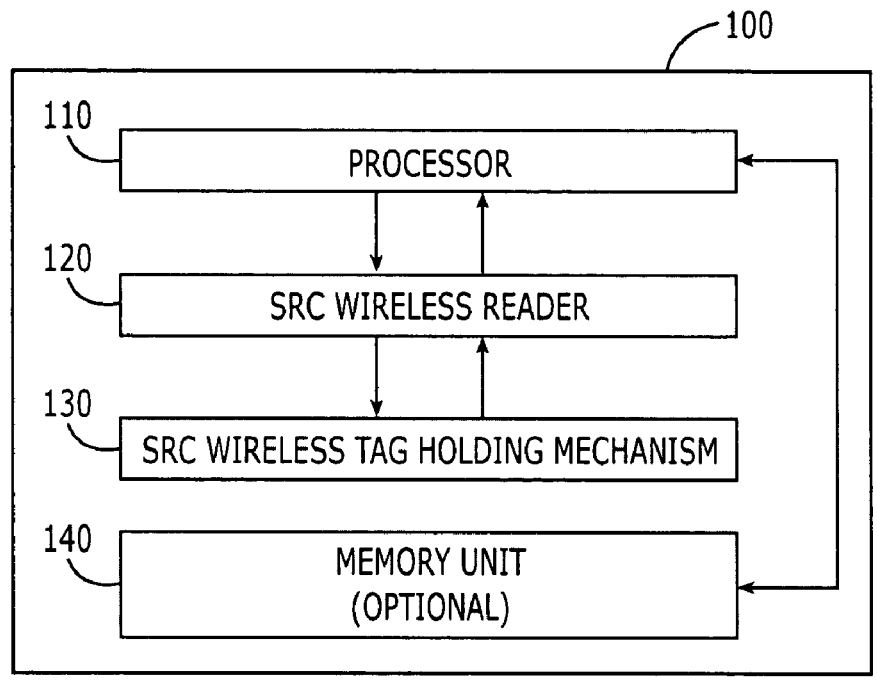

FIG. 3 is a block diagram of a mobile terminal device, in accordance with an embodiment of the present invention.

Figure 4:
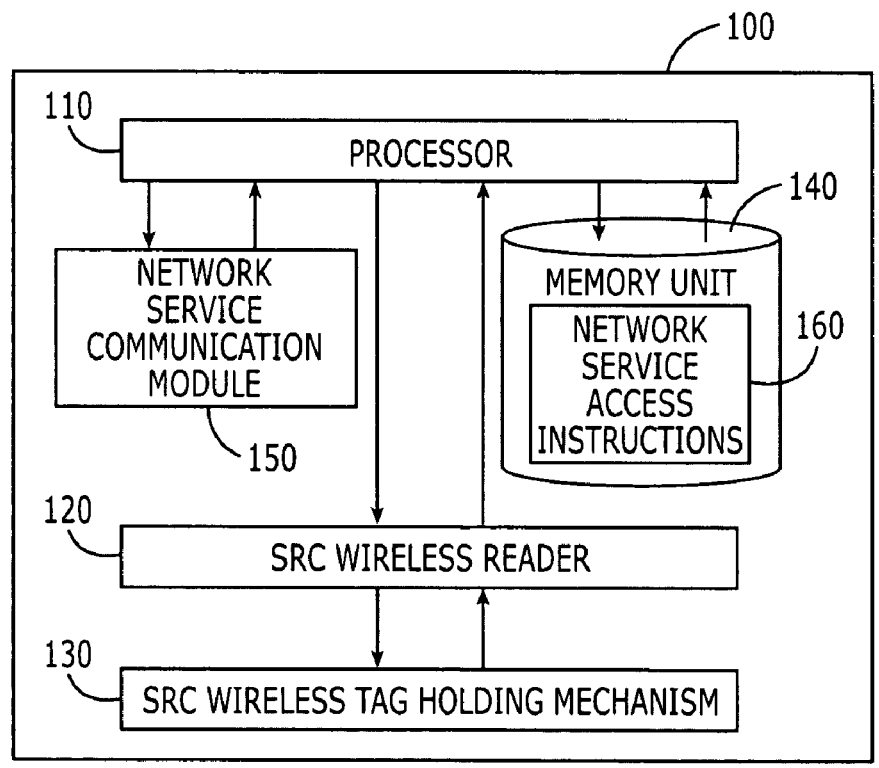

FIG. 4 is a block diagram of an alternative mobile terminal device, in accordance with an embodiment of the present invention.

Figure 5:
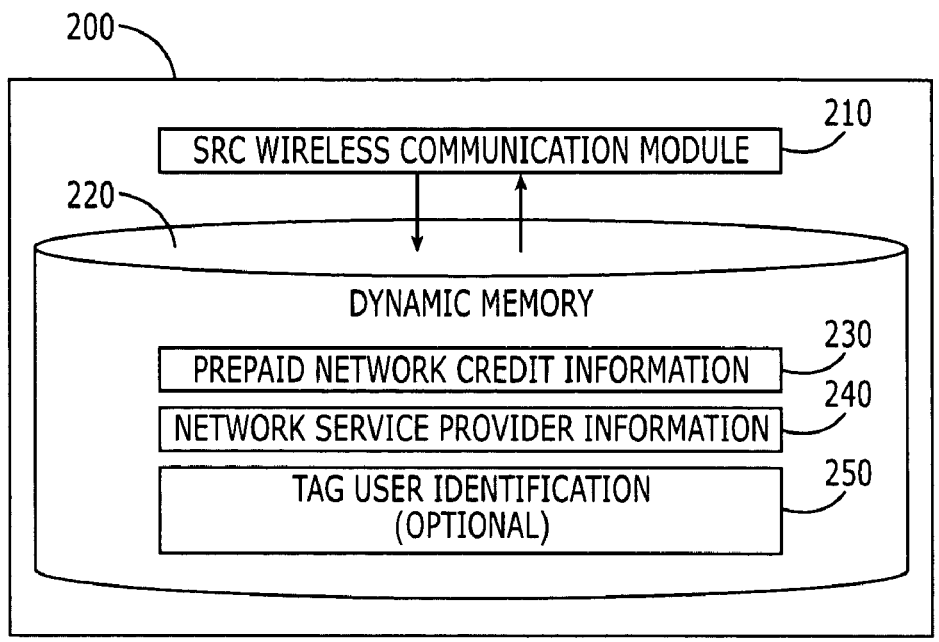

FIG. 5 is a block diagram of a short-range wireless communication tag/smart card, in accordance with an embodiment of the present invention.

Figure 6:
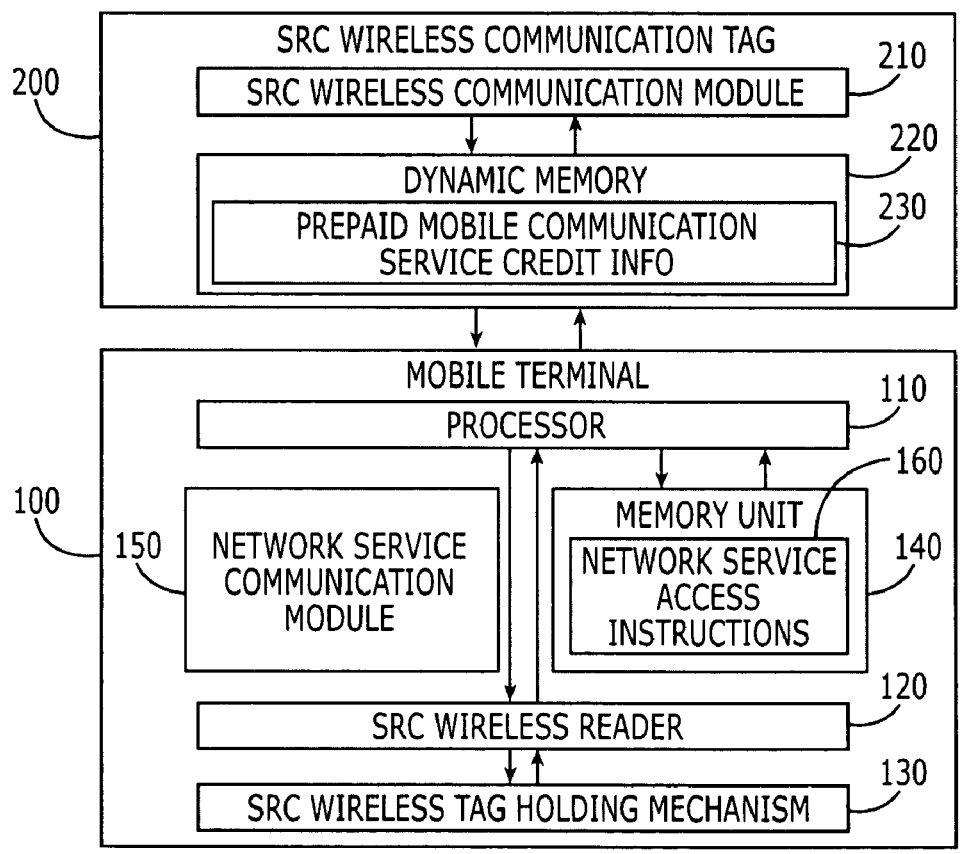

FIG. 6 is a block diagram of a system for providing prepaid network service to a mobile terminal device, in accordance with an embodiment of the present invention.

Figure 7:
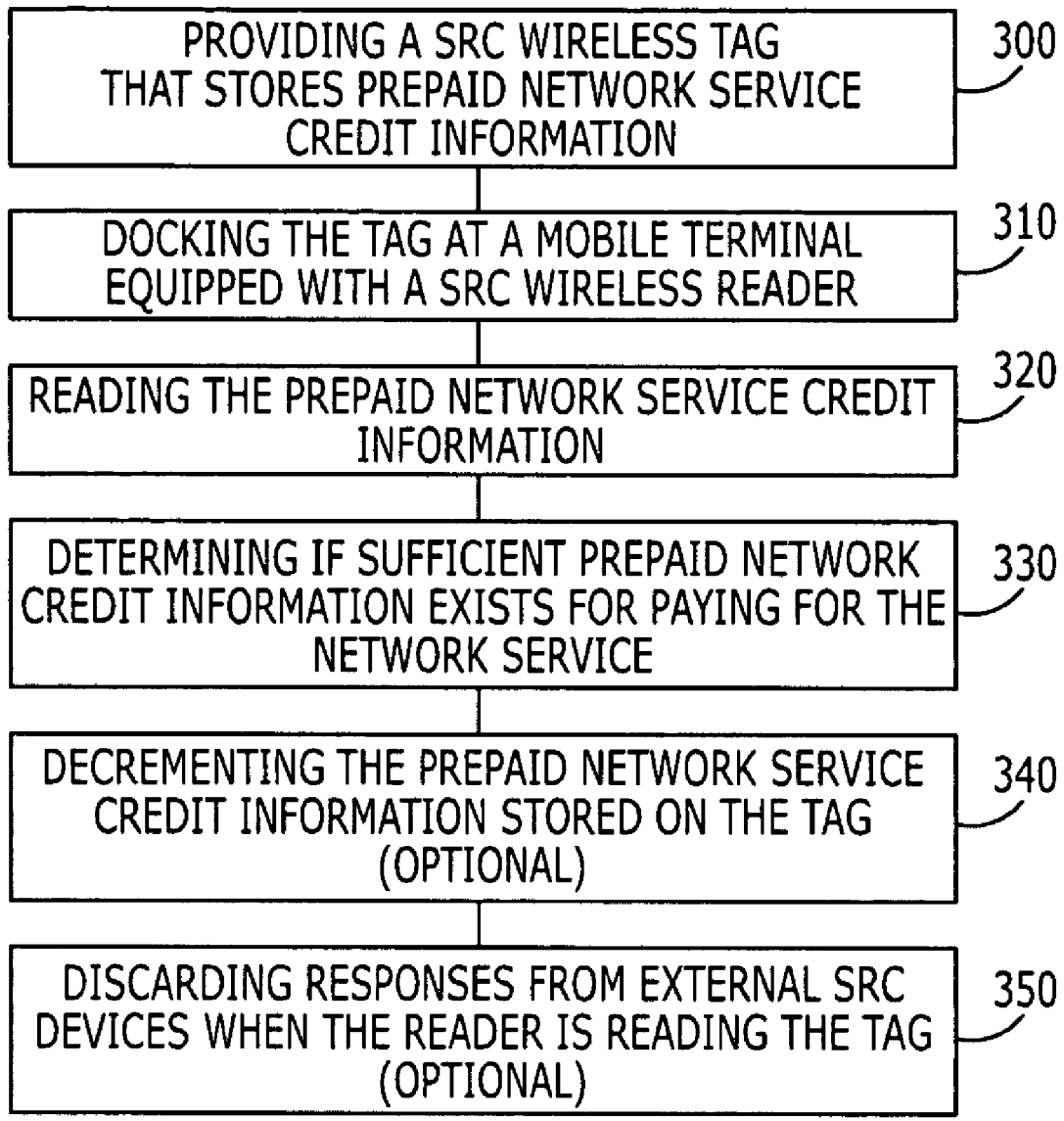

FIG. 7 is a flow diagram of a method for providing prepaid network service to a mobile terminal device, in accordance with an embodiment of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention provides for docking short-range wireless communication tags, such as Radio Frequency Identification (RFID) or near Field Communication (NFC) smart cards onto a mobile terminal having a corresponding short-range wireless communication reader device, such as an RFID reader or a NFC reader. Docking of the tag to the mobile terminal may take the form of attaching or otherwise affixing the tag to the mobile terminal via a tag holding mechanism, such that the reader device may continuously communicate with the tag and also provide for communication with other short-range wireless communication tags and devices in the proximity of the mobile terminal. In one specific embodiment the tag/smart card will store prepaid network service credit information along with applicable network service identification information and user identification. In this regard, when the tag/smart card is decoded to the mobile terminal, the reader is capable of assessing the network service credit available on the tag/smart card and the mobile terminal will be provided access to the network service, such as cellular service, Internet service, digital video broadcast, etc., if sufficient credit is available.

Referring to FIG. 1, a block diagram of a standard cellular network is shown, in which the mobile cellular devices have the additional ability to perform as readers of short-range wireless communications, such as Radio Frequency Identification (RFID), Near Field Communication (NFC) or the like, in accordance with the present invention. The network 10 will include a mobile terminal 12 (typically the network will include a plurality of terminals, although for the sake of clarity only one terminal is shown), which includes a network antenna 14 for transmitting signals to and for receiving signals from a base site or base station (BS) 16. The base station is a part of a cellular network that includes elements required to operate the network, such as a mobile switching center (MSC) 18. As is known by those of ordinary skill in the art of telecommunications, the cellular network may also be referred to as a Base Station, Mobile Switching Center and Interworking function (BMI) 20. In operation, the MSC is capable of routing calls and messages to and from the terminal when the terminal is making and receiving calls. The MSC also provides a connection to landline trunks when the terminal is involved in a call. Further, the MSC can, but need not, be coupled to a server GTW 22 (Gateway).

The MSC 18 can be coupled to a network, such as a local area network (LAN), a metropolitan area network (MAN), and/or a wide area network (WAN). The MSC can be coupled to the network directly, or if the system includes a GTW 22 (as shown), the MSC can be coupled to the network via the GTW. In one typical embodiment, for example, the MSC is coupled to the GTW, and the GTW is coupled to a WAN, such as the Internet 24. In turn, devices such as processing elements (e.g., personal computers, server computers or the like) can be coupled to the terminal 10 via the Internet. For example, the processing elements can include one or more processing elements associated with an origin server 26.

In addition to cellular network communication, the terminal 12 will be equipped to communicate with other devices via short-range communication techniques. In the FIG. 1 embodiment the terminal 12 communicates with transponder 28, commonly referred to as a tag and device 30 equipped with internal short-range transceiver 32 through a short-range interface. As will be appreciated, the electronic devices and tags can comprise any of a number of different known devices and tags capable of transmitting and/or receiving data in accordance with any of a number of different short-range wireless techniques. For example, the short-range wireless technique may include RFID, NFC, Bluetooth® (i.e., communication in the 2.4 GHz frequency band), IrDA (Infrared Data Association), UWB (Ultra Wideband) or the like. The electronic device 30 may include any of a number of different devices, including other mobile terminals, and wireless accessories, portable digital assistants (PDAs), pagers, laptop computers and other types of electronic systems. Likewise, for example, the transponders/tags can comprise RFID smart cards, NFC smart cards or the like.

Referring to FIG. 2, shown is a block diagram of a standard digital broadcast system, such as a digital video broadcast system, in which the mobile devices have the additional ability to perform as readers of short-range wireless communications, such as RFID, NFC or the like, in accordance with an alternate embodiment of the present invention. The system 50 will include a plurality of mobile terminals 52 (shown as 52A and 52B) that are equipped to receive both digital broadcast signals and short-range communication signals. For example, the terminals may comprise mobile telephones with video capabilities and RFID or NFC capabilities.

The system additionally includes a content provider 54 that is in communication with one more content sources, 56A and 56B that store content to be delivered to the mobile terminals. For example, the content sources may store audio-visual content, data files, image files or the like. The content may be communicated to the mobile terminals using Internet protocol (IP) over a digital broadband network, such as DVB-T or DVB-H network, in what is commonly referred to as an IP Datacasting (IPDC) service.

The content is communicated to a network element 58, which typically includes a server configured to receive the content data and to generate recovery data for use in forward error correction of the content data. The content data may be subsequently communicated to the mobile terminals via a first channel. In the illustrated embodiment, the first communication channel is provided by a unidirectional digital broadcasting network 60, such as DVT-B or DVT-H, which includes wireless transmitter 62. The content is broadcasted, multicasted or unicasted from the transmitter to all configured and authorized mobile terminals (52A and 52B) within the confines of a cell associated with the first communication channel.

The recovery data may be communicated to the mobile terminals via a second communication channel. In the illustrated embodiment the second communication channel is provided by a bi-directional Third Generation (3G) mobile network 70, which includes a wireless transmitter 72.

It should be noted that the communication paths for the content and recovery data are shown in FIG. 2 in a simplified form. However, other elements, such as further transmitters, network elements or networks, may be situated in the communication paths between the content source and the mobile terminals.

In addition to digital broadcast network communication, the terminals 52A and 52B will be equipped to communicate with other devices via short-range communication techniques. In the FIG. 2 embodiment the terminals communicate with transponder 80, commonly referred to as a tag and device 90 equipped with internal short-range transceiver 92 through a short-range interface. As will be appreciated, the electronic devices and tags can comprise any of a number of different known devices and tags capable of transmitting and/or receiving data in accordance with any of a number of different short-range wireless techniques. For example, the short-range wireless technique may include RFID, NFC, Bluetooth® (i.e., communication in the 2.4 GHz frequency band), IrDA (Infrared Data Association), UWB (Ultra Wideband) or the like. The electronic device 90 may include any of a number of different devices, including other mobile terminals, and wireless accessories, portable digital assistants (PDAs), pagers, laptop computers and other types of electronic systems. Likewise, for example, the transponders/tags can comprise RFID smart cards, NFC smart cards or the like.

FIG. 3 provides a block diagram of a mobile terminal having a reader device and a mechanism for holding an associated tag/smart card, in accordance with an embodiment of the present invention. The mobile terminal 100 will include a processor 110, a short-range wireless communication reader 120 in communication with the processor; and a short-range wireless communication tag holding mechanism 130 affixed to the mobile terminal. The reader is adapted to communicate with a tag or smart card placed in the holding mechanism while adapted to communicate also with external short-range wireless communication capable devices. The reader will typically communicate with the tag periodically based on a predefined frequency and the reader will communicate with, i.e., interrogate, the external devices during those periods in which it is not communicating with the tag. Collision problems between the tag and external devices are typically mitigated due to the strong signal from the tag or by implementing conventional anti-collision applications.

The mobile terminal will typically also include memory unit 140 in communication with processor 110 that stores processor operating instructions and information read from the tags, smart cards or external short-range communication capable devices.

The mobile terminal 100 may include any portable terminal that benefits from short-range wireless communication. For example, the mobile terminal may be a data collection terminal, a cellular telephone, a personal digital assistant (PDA) or the like. The short-range wireless communication reader 120 may include any suitable reader, such as an RFID reader, a NFC reader or the like.

The tag holding mechanism 130 will correspond to the type of reader that the terminal implements. For example, if the reader is a RFID reader then the tag holding mechanism will accommodate RFID tags/smart cards and so on. The tag holding mechanism will be embodied in any mechanism that allows for the tag to be docked to the mobile terminal, such that the tag is continuously read by the reader. For example, the tag holding mechanism may be a slot or sleeve affixed to or configured within the mobile terminal body. Preferably, the tag-holding mechanism will be configured within the mobile terminal such that it is positioned within the optimally; i.e., within the "sweet spot" for reading data. As such, the tag holding mechanism may be configured external to or internal to the mobile terminal device.

In one embodiment of the invention the mobile terminal will provide access to network services in which payment for the services is provided by credit that is stored in the docked tag/smart card. FIG. 4 provides a block diagram of an alternate embodiment of the mobile device, in accordance with an embodiment of the invention. The mobile terminal 100 will include a processor 110, a short-range wireless communication reader 120 in communication with the processor and a short-range wireless communication tag holding mechanism 130 affixed to the mobile terminal. The mobile terminal will additionally include a network service communication module 150 in communication with the processor and a memory unit 140 in communication with the processor that stores network service access instructions 160. The network communication module 150 comprises, according to one embodiment of the present invention, a cellular network transceiver, which provides an interface to cellular network services. According to an alternative embodiment, the network service communication module comprises a digital broadcast receiver, such as, for example, a DVB-T or DVB-H receiver providing access to digital broadcast services. The reader 120 is adapted to communicate with a tag placed in the holding mechanism and the tag includes dynamic storage of prepaid network service credit information for enabling a user of the tag to access network service via the mobile terminal device. While the reader is adapted to communicate with the tag, the reader is also adapted to communicate with one or more external short-range wireless communication capable devices. As previously mentioned, the reader will typically communicate with the tag periodically based on a predefined frequency and the reader will communicate with, i.e., interrogate, the external devices during those periods in which it is not communicating with the tag. Communication between the tag and the reader will typically involve the communication of tag identification (ID) so that all other responses from external devices may be ignored during the tag communication period. Collision problems between the tag and external devices are typically mitigated due to the strong signal from the tag or by implementing conventional anti-collision applications.

The mobile terminal 100 may include any portable terminal that provides for network service communication. Network communication may include, but is not limited to, cellular network service, Internet service, digital broadcasting service, such as, for example, digital video broadcast (DVB-T or DVB-H) service and the like. Thus, the mobile terminal, may be a cellular telephone, a personal digital assistant, or any kind of portable terminal capable of communicating with a cellular network or the Internet and/or equipped with a digital broadcast receiver or the like. In some embodiments the mobile terminal may be equipped to provide more than one network service and, therefore, the need may exist to provide for more than one network service communication module 150 and corresponding network service access instructions 160.

Similar to the embodiments shown in FIG. 3, the short-range wireless communication reader 120 may include any suitable reader, such as an RFID reader, a NFC reader or the like and the tag holding mechanism 130 will correspond to the type of reader that the terminal implements. If the mobile terminal supports more than one reader device (for example, a RFID reader and a NFC reader) or if the terminal provides access to more than one network service (for example, cellular network service and broadcast services), the terminal may include multiple tag holding mechanisms. Multiple tag holding mechanisms would provide for more than one tag./smart card to be docked to the mobile terminal simultaneously, thus allowing for different services to be activated without having to change tags/smart cards.

FIG. 5 provides a block diagram of a short-range wireless communication tag, i.e., smart card, in accordance with an embodiment of the present invention. The tag 200 includes a short-range wireless communication module 210 and a dynamic memory unit 220 that stores prepaid network credit information 230, network service provider identification 240 and optionally tag user identification 250. A mobile terminal equipped with a short-range communication reader can communicate with the tag in order to provide prepaid network service to the mobile terminal. Typically the tag/smart card will be continuously docked onto the mobile terminal such that the mobile terminal can access and decrement the credit information from the tag/card whenever a user of the mobile terminal desires to access the network service.

The network service provider identification 240 will allow the mobile terminal to recognize the network service that pertains to the prepaid credit and the user identification information 250 will allow the mobile terminal to recognize the user of the tag/smart card. In one embodiment the service provider comprises information relating to digital broadcasting services, such as, for example DVB-T or DVB-H services. DVB-H is particularly designed to reduce necessary power consumption for accessing to digital broadcasting services. As such, DVB-H is especially suitable for battery-powered devices, such as, for example, mobile telephones, PDA devices and the like. In one embodiment the user identification may be a telephone number or the like. In addition to the credit, network service provider and user information the tag may include storage of other information including, but not limited to, a user's telephone book, a user's settings, a user's bookmarks, a personal information management (PIM) module and the like. This information may be updated directly from an associated mobile terminal to which the tag/smart card is docked to and is transferable to mobile devices FIG. 6 provides a block diagram of the system for providing prepaid network service to a mobile terminal, in accordance with an embodiment of the present invention. The system includes a short-range wireless communication tag 200, such as a smart card, that includes a short-range wireless communication module 210 and dynamic memory 220 in communication with the module that stores prepaid mobile communication service credit information 230. The system additionally includes a mobile terminal 100 that includes a processor 110, a network service communication module 150 in communication with the processor, a memory unit 140 in communication with the processor that stores network service access instructions 160, a short-range wireless communication reader 120 in communication with the processor, and a short-range wireless communication tag holding mechanism 130 affixed to the mobile terminal for holding the tag. The reader is adapted to communicate with the tag docked in the holding mechanism such that reading the tag provides mobile terminal device access to the network service if sufficient prepaid credit information is included in dynamic storage of the tag. The reader is also to communicate with tag while also communicating with external short-range communication devices. For example, the reader will typically be configured to periodically read the tag docked in the holding mechanism and to interrogate and read information from proximate external devices during periods in which the tag is not being read.

The system operates in the following manner. A user who desires network service will purchase network service credit, typically either a monetary unit (e.g., $5.00) or time unit (e.g. 30 minutes) in the form of a tag, i.e., smart card. In addition to the credit information the tag will include the network service provider information and the user information (e.g. a user telephone number or the like). The tag may additionally include other user specific information such as settings, telephone book, bookmarks, PIM or the like. The user will then dock the tag in a mobile terminal having the appropriate tag holding mechanism and appropriate tag reader. When the mobile terminal is powered on, the reader will be activated and will read the information included within the docked tag. When the user desires to access the network service, for example a cellular network service, the mobile terminal will access the tag information and determine if sufficient credit exists to provide for the network service. Once the service has been accessed the reader will communicate with the tag and decrement the credit, in real-time, such that the tag/smartcard always reflects the current credit available. If the tag/smart card requires additional credit, the user can un-dock the tag/card from the terminal and purchase additional credit (i.e., top-up the tag/smart card) at a service provider kiosk or some other point of sale (POS) location. Note, in alternate embodiments in which the tag/smart card is internal to the mobile terminal, purchasing additional credit may entail returning the entire mobile terminal to a POS to purchase additional credit.

According to specific embodiments of the present invention, the mobile terminal includes a generic or "dummy" Subscriber Identity Module (SIM) that allows the mobile terminal to switch to an on mode but does not provide for access to the network service. Conventional SIM modules associate the mobile terminal with one user, typically by assigning the mobile terminal the user's telephone number. The generic SIM module allows the mobile terminal to associate with the user of the docked tag/smart card. In this regard, the mobile terminal can change user association by changing the tag/smart card that is docked in the mobile terminal. The mobile terminal will recognize the new user from the user identification stored on the tag/smart card and access the network service based on the credit stored on the newly docked tag/smart card. This facet of the invention allows for multiple users to be associated with and be provided network access through a single mobile terminal device.

FIG. 7 provides a flow diagram of a method for providing prepaid network services to a mobile terminal. The method begins at step 300, in which a short-range wireless communication tag is provided that stores prepaid network credit information, network service provider identification and user identification. The tag may take the form of any suitable short-range wireless communication medium, such as an RFID smart card, a NFC smart card or the like. In addition to credit, network service provider and user identification, the tag may store user settings, user bookmarks, user telephone book, PIM and the like.

At step 310, the tag is docked at a mobile terminal that is equipped with a short-range wireless communication reader. Docking may entail placing the tag in a tag-holding mechanism, such as a slot or sleeve configured externally or internally within the mobile terminal. When the mobile terminal is powered-up, at step 320, the mobile terminal will read the prepaid network credit information, the network service provider identification and the user identification from the associated tag. This information will allow the mobile terminal to recognize the network service provider, the user of the service (i.e., the tag user) and the available credit. Additionally, the step may include reading a tag identification that distinguishes the tag from external short-range wireless communication devices that may be attempting to communicate with the mobile terminal.

At step 330, the mobile terminal makes a determination as to whether the prepaid network credit information is determined to be sufficient for paying for the network service and, if so, provides for access to the network service. For example, if the network service is a cellular network, the mobile terminal will determine if credit is available to place and/or receive telephone calls and, if so, allows calls to be placed and/or calls to be received at the mobile terminal.

The method may additionally include optional step 340, decrementing the prepaid network credit information stored on the tag as a result of the mobile terminal being provided the network service. The reader device will communicate depletion of the credit information based on network usage and, as such the amount of credit available on the tag will reflect a current, real-time balance. Once the credit has been exhausted the network service will no longer be available. For example, if the network service is a cellular network, the mobile terminal will no longer be able to make cellular network telephone calls. The mobile terminal may provide for user-notification when the available credit reaches a predefined minimum threshold. User-notification will serve to notify the user that additional credit is required if the user desires uninterrupted network service.

Additionally, the method may include optional step 350, in which the reader discards short-range responses from the one or more short-range wireless communication devices while reading the at least prepaid network service credit information from the associated tag. In this regard, the reader is only able to read responses from the external short-range wireless communication devices during those periods when the reader is not interrogating and/or reading the tag contents. Collisions between the signals from the tag and the external devices may be avoided or mitigated by using conventional anti-collision routines.

Typically the tag user will be able to increase the credit amount (top-up the credit) by purchasing additional credit from a service provider Point of Sale (POS). POS locations may be kiosks located at retail sources, airports, and other public venues. Additional credit will typically be any denomination desired by the user; allowing for micro payment, from cents to dollars, to accommodate the needs of the prepaid card user. Additionally, the credit balances available on tags/cards are transferable, such that numerous balances on multiple cards can be combined onto a single tag/card or one user's balance can be transferred to another user's card.

Thus, the present invention provides for devices, systems and methods for docking short-range wireless communication tags, such as Radio Frequency Identification (RFID) or near Field Communication (NFC) smart cards onto a mobile terminal having a corresponding short-range wireless communication reader device, such as an RFID reader or a NFC reader. Docking of the tag to the mobile terminal may take the form of attaching or otherwise affixing the tag to the mobile terminal via a tag holding mechanism, such that the reader device may continuously communicate with the tag and also provide for communication with other short-range wireless communication tags and devices in the proximity of the mobile terminal. In one specific embodiment the tag/smart card will store prepaid network service credit information along with applicable network service identification information and user identification. In this regard, when the tag/smart card is docked to the mobile terminal, the reader is capable of assessing the network service credit available on the tag/smart card and the mobile terminal will be provided access to the network service, such as cellular service, Internet service, digital video broadcast, etc., if sufficient credit is available.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus comprising a processor, the processor configured to:

provide for short-range wireless interrogations of a tag in a holding mechanism affixed to the apparatus, the processor being configured to provide for interrogations of the tag periodically based on a frequency cycle, and the interrogations of the tag being radio frequency identification Radio communications while being configured to provide for periodic communications with one or more external short-range wireless communication capable devices based on the frequency cycle at times when no communications with the tag placed in the holding mechanism are occurring.

2. An apparatus according to claim 1, wherein the short-range wireless interrogations of the tags are further defined as Near Field Communications (NFC).

3. An apparatus according to claim 1, wherein the holding mechanism is further defined as a tag-holding slot configured in the apparatus.

4. An apparatus according to claim 1, wherein the holding mechanism is further defined as a smart card holding mechanism.

5. An apparatus according to claim 1, further comprising memory in communication with the processor, wherein the memory stores information read from a tag placed in the holding mechanism.

6. An apparatus comprising a processor, the processor configured to:

provide for short-range wireless interrogations of a tag in a holding mechanism affixed to the apparatus to obtain network service credit information from the tag that enables a user of the tag to access network service via the apparatus, the processor being configured to provide for interrogations of the tag periodically based on a frequency cycle, and the interrogations of the tag being radio frequency identification communications while being configured to provide for periodic communications with one or more external short-range wireless communication capable devices based on the frequency cycle at times when no communications with the tag placed in the holding mechanism are occurring.

7. An apparatus according to claim 6, wherein the apparatus is further defined as a mobile telephone device.

8. An apparatus according to claim 6, wherein the holding mechanism is further defined as a tag-holding slot in the apparatus.

9. An apparatus according to claim 6, wherein the holding mechanism is further defined as a smart card holding mechanism.

10. An apparatus according to claim 6, further comprising a memory unit in communication with the processor, wherein the memory unit stores prepaid network credit information read from the tag placed in the holding mechanism.

11. An apparatus according to claim 6, wherein the processor is further configured to communicate with a cellular network transceiver.

12. An apparatus according to claim 6, wherein the processor is further configured to communicate with a digital broadcast transceiver.

13. An apparatus according to claim 12, wherein the digital broadcast receiver module is further defined as a Digital Video Broadcast (DVB) receiver.

14. An apparatus comprising:

a radio frequency identification reader;

a holding mechanism; and a processor, the processor configured to:

instruct the radio frequency identification reader to communicate with a short-range wireless communication tag placed in the holding mechanism periodically based on a predefined frequency cycle through radio frequency identification communications while being configured to instruct the radio frequency reader to periodically transmit short-range wireless interrogations based on the predefined frequency cycle to communicate with external short-range wireless communication capable devices at times when no communication with the tag placed in the holding mechanism are occurring.

15. The apparatus system of claim 14, wherein the short-range wireless communication tag is further defined as a near field communication (NFC) smart card tag.

16. The apparatus system of claim 14, wherein the processor is further configured to provide for communications with a cellular network transceiver.

17. The apparatus system of claim 14, wherein the processor is further configured to provide for communications with a digital broadcast receiver.

18. The apparatus of claim 17, wherein the digital broadcast receiver module is further defined as a Digital Video Broadcast (DVB) receiver.

19. The apparatus of claim 14, wherein the processor is further configured to provide for decrementing prepaid credit information of the tag if the apparatus is provided access to a network based on prepaid credit information provided by the tag.

20. A method comprising:
periodically interrogating a tag in a holding mechanism, based on a frequency cycle, to communicate at least prepaid network service credit information from the tag, the tag storing at least prepaid network credit information and network service provider identification, and the interrogating being Radio Frequency Identification (RFID) communications;
while providing for periodic communications with external short-range wireless communication capable devices based on the frequency cycle at times when no communications with the tag placed in the holding mechanism are occurring; and
providing access to a network based on the prepaid network credit information.

21. The method of claim 20, further comprising decrementing the prepaid network credit information stored on the tag if access to the network is provided.

22. The method of claim 20, further comprising reading a tag identification that distinguishes the tag from the one or more external short-range wireless communication devices.

23. The method of claim 20, further comprising discarding short-range responses from the one or more short-range wireless communication devices while the at least prepaid network service credit information is being communicated from the tag.

24. A computer program product comprising at least one computer-readable storage medium having computer-readable program instructions embodied in the medium, the computer-readable program instructions comprising:
instructions configured to provide for periodic short-range wireless interrogations of a short-range wireless communication tag that is docked at an apparatus, the instructions being configured to provide for the interrogations based on a frequency cycle and the interrogations being Radio Frequency Identification (RFID) communications while being configured to provide for periodic short-range wireless communication reading of external short-range wireless communication devices based on the frequency cycle at times when no communications with the tag docked at the apparatus are occurring.

25. The computer program product of claim 24, wherein the instructions being configured to provide for interrogations of the tag include being configured to provide for communication of pre-paid network service access credit to allow access to a network service.

26. The computer program product of claim 25, wherein the instructions being configured to provide for interrogations of the tag include being configured to discard responses from the external short-range wireless communication devices during communication of the at least pre-paid network service access credit information from the short-range wireless communication tag that is docked at the apparatus.

27. The computer program product of claim 24, wherein the instructions being configured to provide for interrogations of the tag include being configured to determine the frequency cycle based on the billing terms of a pre-paid network service associated with the short-range wireless communication tag.

28. The computer program product of claim 24, wherein the instructions being configured to provide for interrogations of the tag include being configured to read a tag identification that distinguishes the tag from external short-range wireless communication devices.

29. The apparatus of claim 1 further comprising:
a radio frequency identification reader; and
the holding mechanism;
wherein the processor being configured to provide for short-range wireless interrogation of the tag includes being configured to instruct the radio frequency reader to communicate with the tag placed in the holding mechanism, and wherein the processor being configured to provide for periodic communications with the one or more external short-range wireless communication capable devices includes being configured to provide for periodic communications with one or more external short-range wireless communication capable devices based on the frequency cycle at times when no communications with the tag placed in the holding mechanism are occurring.

30. The apparatus of claim 29 wherein the tag is a smart card.

31. The apparatus of claim 6 further comprising:
a radio frequency identification reader; and
the holding mechanism;
wherein the processor being configured to provide for short-range wireless interrogations of the tag includes being configured to instruct the radio frequency reader to communicate with the tag placed in the holding mechanism, and wherein the processor being configured to provide for periodic communications with the one or more external short-range wireless communication capable devices includes being configured to provide for periodic communications with one or more external short-range wireless communication capable devices based on the frequency cycle at times when no communications with the tag placed in the holding mechanism are occurring.

32. The apparatus of claim 31 wherein the tag is a smart card.

33. The apparatus of claim 14, wherein the processor is further configured to provide for accessing a network based on prepaid network credit information provided by the tag.

* * * * *